(12) United States Patent
Rasidescu et al.

(10) Patent No.: US 8,074,759 B2
(45) Date of Patent: Dec. 13, 2011

(54) METHOD OF ASSEMBLING A MODULAR SNOWMOBILE PLATFORM

(75) Inventors: Mihai Rasidescu, Sherbrooke (CA); Denis Morin, Valcourt (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 12/710,150

(22) Filed: Feb. 22, 2010

(65) Prior Publication Data

US 2010/0288574 A1   Nov. 18, 2010

Related U.S. Application Data

(60) Continuation of application No. 11/422,543, filed on Jun. 6, 2006, now abandoned, which is a division of application No. 10/734,267, filed on Dec. 15, 2003, now abandoned.

(51) Int. Cl.
*B62M 27/02* (2006.01)
(52) U.S. Cl. .......................................... 180/190; 29/469
(58) Field of Classification Search .................. 180/182, 180/186, 190, 183, 184, 185; 29/428, 429, 29/469
See application file for complete search history.

(56) References Cited

U.S. PATENT DOCUMENTS

| | | | |
|---|---|---|---|
| 3,309,150 A | 3/1967 | Marier | |
| 3,774,706 A * | 11/1973 | Kiekhaefer | 180/185 |
| 3,778,074 A | 12/1973 | Kozlow | |
| 3,794,131 A | 2/1974 | Freedman et al. | |
| 4,422,685 A | 12/1983 | Bonfilio et al. | |
| 4,570,738 A | 2/1986 | Grinde et al. | |
| 4,596,192 A | 6/1986 | Forster | |
| 4,676,545 A | 6/1987 | Bonfilio et al. | |
| 4,712,287 A | 12/1987 | Johnston | |
| 4,826,184 A | 5/1989 | Kuehmichel et al. | |
| 4,900,083 A | 2/1990 | Kumasaka et al. | |
| 5,090,105 A | 2/1992 | DeRees | |
| 5,660,245 A | 8/1997 | Marier et al. | |
| 5,944,133 A | 8/1999 | Eto | |
| 6,095,275 A * | 8/2000 | Shaw | 180/185 |
| 6,155,656 A | 12/2000 | Gulla | |
| 6,446,744 B2 | 9/2002 | Wubolts | |
| 6,499,551 B2 | 12/2002 | Karpik | |
| 6,561,302 B2 * | 5/2003 | Karpik | 180/291 |
| 6,655,487 B2 | 12/2003 | Mallette et al. | |
| 6,836,943 B2 | 1/2005 | Chernoff et al. | |
| 6,860,352 B2 | 3/2005 | Mallette et al. | |
| 6,926,107 B2 | 8/2005 | Nishijima | |

(Continued)

OTHER PUBLICATIONS

"600 Classic Touring" from www.polarisindustries.com, Feb. 3, 2003.

(Continued)

*Primary Examiner* — Kevin Hurley
(74) *Attorney, Agent, or Firm* — Olser, Hoskin & Harcourt LLP

(57) ABSTRACT

The present invention concerns a method for designing and manufacturing a snowmobile platform. The method entails designing and manufacturing a group of tunnel subassemblies, designing and manufacturing a group of engine cradle subassemblies, and designing and manufacturing a group of front suspension subassemblies. Next, one tunnel subassembly, one engine cradle subassembly, and one front suspension subassembly are selected from each respective group. Then, the tunnel subassembly is connected to the engine cradle subassembly at a rear portion thereof. Finally, the front suspension subassembly is connected to the engine cradle subassembly at a front portion thereof to create the snowmobile platform. The present invention also concerns a snowmobile platform constructed according to this method, which combines, among other elements, a tunnel subassembly, an engine cradle subassembly, and a front suspension subassembly.

12 Claims, 7 Drawing Sheets

U.S. PATENT DOCUMENTS

| | | |
|---|---|---|
| 6,976,307 B2 | 12/2005 | Chernoff et al. |
| 7,017,690 B2 | 3/2006 | Burke |
| 7,124,848 B2 | 10/2006 | Girouard et al. |
| 7,451,846 B2 * | 11/2008 | Wubbolts et al. .............. 180/183 |
| 7,513,327 B1 * | 4/2009 | Peterson ........................ 180/183 |
| 7,753,154 B2 * | 7/2010 | Maltais ......................... 180/190 |
| 2002/0100631 A1 | 8/2002 | Nishijima |
| 2010/0288572 A1 * | 11/2010 | Maltais ......................... 180/190 |

OTHER PUBLICATIONS

"600 Classic" from www.polarisindustries.com, Feb. 3, 2003.
"Indy 600 XC SP" from www.polarisindustries.com, Feb. 3, 2003.
"700 Classic" from www.polarisindustries.com Feb. 3, 2003.
"Indy 700 XC SP" from www.polarisindustries.com, Feb. 3, 2003.
"Indy 800 XC SP" from www.polarisindustries.com, Feb. 3, 2003.

* cited by examiner

METHOD OF ASSEMBLING A MODULAR SNOWMOBILE PLATFORM

RELATED APPLICATIONS

This application is a continuation of U.S. patent application Ser. No. 11/422,543, titled "MODULAR SNOWMOBILE PLATFORM", filed Jun. 6, 2006. Through the '543 application, this application is also a division of U.S. patent application Ser. No. 10/734,267, titled "MODULAR SNOWMOBILE PLATFORM", filed Dec. 15, 2003. Through the '267 application, this application claims the benefit of priority to U.S. Provisional Patent Application Ser. No. 60/429,536 entitled "MODULAR SNOWMOBILE PLATFORM" which was filed on Nov. 29, 2002. This application is also related to U.S. Non-Provisional patent application Ser. No. 10/141,135, which was filed on May 9, 2002. This application is also related to U.S. Non-Provisional patent application Ser. No. 09/877,064, filed Jun. 11, 2001, claiming priority to U.S. Provisional Patent Application Ser. No. 60/246,110, filed Nov. 7, 2000. In addition, this application relates to U.S. Non-Provisional patent application Ser. No. 09/472,133, entitled "IMPROVED VEHICLE" filed on Dec. 23, 1999. That application claims priority to Canadian Patent Application No. 2,256,944, which was filed on Dec. 23, 1998. This application also relates to U.S. Non-Provisional patent application Ser. No. 09/472,134, entitled "SNOWMOBILE," which was filed on Dec. 23, 1999. In addition, this application relates to U.S. Provisional Patent Application Ser. No. 60/230,432, entitled "A NOVEL THREE-WHEELED VEHICLE," which was filed on Sep. 6, 2000. Finally, this application relates to U.S. Provisional Patent Application No. 60/237,384, which was filed on Oct. 4, 2000. The contents of each of the applications enumerated above, both domestic and foreign, are incorporated herein by reference.

BACKGROUND OF THE INVENTION

1. Field of the Invention

The present invention concerns the construction of a snowmobile. More specifically, the present invention concerns, first, a method for the design, construction, and assembly of platform for a snowmobile and, second, the platform made according to that method.

2. Description of the Related Art

The basic platform for a conventional snowmobile includes three components, a tunnel at the rear of the snowmobile, an engine cradle connected at the front of the tunnel, and a front suspension connected to the engine cradle. The three components are integrally connected to form a unitary structure that is rigid enough to withstand the forces impingent thereupon during operation of the snowmobile.

In the conventional snowmobile, the tunnel is disposed above an endless track that propels the vehicle. The engine cradle is the structural portion of the platform that extends forwardly from the tunnel and supports the engine near the front of the vehicle. The front suspension is the structural component integrated as a part of the engine cradle, located to the sides of the engine cradle. The steering skis are suspended from the front suspension, which includes shock absorbers that dampen the forces encountered by the skis as the vehicle travels over either groomed or rough terrain.

FIG. 1 illustrates the construction of one conventional snowmobile platform 10. The tunnel 12 and the engine cradle 14 are depicted in this illustration. The tunnel 12 forms the rear portion of the platform 10 while the engine cradle 14 forms the forward portion of the platform 10.

The tunnel 12 is essentially an inverted, U-shaped element. The tunnel 12 has a top portion 16, a left side portion 18, and a right side portion 20. A left side foot board 22 extends outwardly from the left side portion 18 of the tunnel 12. A right side foot board (not shown) similarly extends outwardly from the right side portion 20 of the tunnel 12.

The rear end 24 of the engine cradle 14 is attached at the front end 26 of the tunnel 12. The engine cradle 14 includes a bottom pan 28, a left side wall 30, a right side wall 32, a front portion 34, and a rear portion 36. Together, the bottom pan 28, the left side wall 30, the right side wall 32, the front portion 34, and the rear portion 36 create a rigid structure onto which the engine for the snowmobile is secured. A structural upright 38 is connected adjacent to the rear portion 36 of the engine cradle 14. The upright 38 provides structural support for the handlebar used to steer the snowmobile.

The tunnel 12 includes openings 40 through the left side 18 and through the right side 20. A drive shaft (not shown) passes through the openings 40. The drive shaft operatively connects to the endless track positioned beneath the tunnel 12 to propel the vehicle. The drive shaft also operatively connects to the engine (not shown), which sits above the bottom pan 28 of the engine cradle 14. As would be understood by those skilled in the art, motive power is transferred from the engine to the endless track via the drive shaft. The opening 40 in the left side 30 of the engine cradle 14 is also illustrated in FIG. 1. A similar opening (not shown) also passes through the right side 32 of the engine cradle 14. The openings 40 in the engine cradle 14 and the openings 40 in the tunnel 12 lie in register with one another so that the drive shaft passes through all four of the openings when the tunnel 12 and the engine cradle 14 are assembled together.

FIG. 2 illustrates one possible embodiment of the front suspension 42 for a conventional snowmobile. While the details of the engine cradle 14 in FIG. 2 differ slightly from those illustrated in FIG. 1, those skilled in the art would appreciate readily that the front suspension 42 illustrated in FIG. 2 may be incorporated as a part of the platform 10 illustrated in FIG. 1.

The left-hand side of the front suspension 42 is shown in FIG. 2. As would be appreciated by those skilled in the art, the right-hand side of the front suspension 42 is a mirror image of the left-hand side. The left-hand side of the front suspension 42 includes a ski leg 44 that is rotatably coupled to a lever arm 46. The lever arm 46, in turn, is pivotally connected to the engine cradle 14 via a structural pivot 48. The lever arm 46 pivots up and down as the snowmobile travels over the ground.

The forward end 50 of the lever arm 46 includes a bracket 52 that connects to the lower end 54 of a shock absorber 56. The upper end 58 of the shock absorber 56 connects to a bracket 60 that is, in turn, connected to the engine cradle 14 at a location 62 near a forward end thereof. The shock absorber 56 dampens the forces encountered by the ski 64 connected at the lower end of the ski leg 44.

As FIGS. 1 and 2 illustrate, the tunnel 12, the engine cradle 14, and the front suspension 42 are integrally assembled to create a rigid frame onto which the remaining elements of the snowmobile are attached.

In the construction of the conventional snowmobile platform 10, the width of the tunnel 12 and the width of the engine cradle 14 are selected as a function of the width of the endless track that propels the vehicle. While engine size typically varies from one model of snowmobile to another, the width of the endless track, and therefore the width of the tunnel 12 and the engine cradle 14, typically remains the same regardless of the size of the engine employed to propel the vehicle. This is because the width of the endless track typically remains the same for all types of snowmobiles.

There are several engine sizes typically incorporated into conventional snowmobiles, including 600 cc (cubic centimeters of displacement), 700 cc, and 800 cc varieties, for example. To accommodate each of these engine sizes, the front suspension 42 and the tunnel 12 of each platform differs from one vehicle to another. The front suspensions 42 differ between vehicle types to accommodate the variations in weight of the different engines. As a general rule, the larger the displacement volume, the heavier the engine. Therefore, the front suspension needs to be more robust. The tunnels 12 vary from one vehicle to another to accommodate different lengths of the endless track.

While the width of the endless track typically remains the same, the length of the endless track can vary from one snowmobile type to another. For a racing snowmobile, which is designed primarily for groomed surfaces, the endless track typically is shorter than the endless track incorporated into a mountain snowmobile, which is designed to operate in ungroomed (or powder) snow. Accordingly, the tunnel 12 for a racing snowmobile is generally shorter than the tunnel 12 for a mountain snowmobile. In addition, the weight of a racing snowmobile is of critical concern because unnecessary weight slows the vehicle, which is antithetical to racing.

Once the platform 10 for the vehicle is designed, the chassis for the snowmobile is designed around it. As with the platform 10, the chassis is designed to accommodate variation in the components of the vehicle.

To manufacture each new vehicle type, whether it is a racing snowmobile, a mountain snowmobile, or a hybrid variety, considerable engineering and manufacturing resources are required. Each new vehicle must be designed from the ground up. From an engineering standpoint, therefore, each new vehicle consumes a significant number of engineering hours because the platform 10 of the vehicle has to be designed from scratch. In addition, from a manufacturing standpoint, each new vehicle consumes a significant number of training hours, because the technicians responsible for assembling the vehicle must be trained to understand the construction of each new vehicle so that the vehicle may be assembled properly on the assembly line. The design and manufacture of a conventional snowmobile, therefore, is inherently inefficient both from a design and from a manufacturing standpoint, because there is a considerable duplication of effort for each new vehicle that is designed and manufactured.

Accordingly, the inefficient method of designing and manufacturing conventional snowmobiles cries out for a solution.

The prior art does not provide a solution for this inefficiency.

SUMMARY OF THE INVENTION

Recently, Bombardier Inc. (Bombardier) of Montreal, Quebec, Canada, a leading producer of snowmobiles, redesigned its snowmobile in response to consumer demand and in an effort to update the design and construction of the vehicle. While designing its new vehicle, Bombardier reexamined the traditional design and manufacturing of snowmobiles to address the inefficiencies enumerated above.

As will be made apparent in the discussion that follows, the new design selected by Bombardier for its new snowmobile led to a departure from traditional design and manufacturing techniques and, as a result, led to the development of the present invention.

Among other aspects and benefits, the present invention provides a novel engineering and manufacturing method for the construction of a snowmobile platform that resolves many of the inefficiencies identified with the design and manufacturing of traditional snowmobile platforms.

In particular, it is one aspect of the present invention to provide a method of designing and manufacturing snowmobile platforms where the cost associated with the design and manufacture of the platform is greatly reduced by comparison with the traditional design and manufacturing technique.

Another aspect of the present invention provides a standardized design for a snowmobile platform.

Still another aspect of the present invention provides a snowmobile platform that is modular in design. Among other things, the modular design accommodates variation between individual platforms while maximizing interchangeability of platform components.

Among other aspects, the present invention provides for a method of assembling a snowmobile platform. The method entails designing and manufacturing a group of tunnel subassemblies comprising at least two tunnel subassemblies. In addition, the method includes designing and manufacturing a group of engine cradle subassemblies comprising at least two engine cradle subassemblies and designing and manufacturing a group of front suspension subassemblies comprising at least two front suspension subassemblies. Next, one tunnel subassembly from the group of tunnel subassemblies, one engine cradle subassembly from the group of engine cradle subassemblies, and one front suspension subassembly from the group of front suspension subassemblies are selected. Then, the tunnel subassembly is connected to the engine cradle subassembly at a rear portion thereof. Finally, the front suspension subassembly is connected to the engine cradle subassembly at a front portion thereof to create the snowmobile platform.

Another aspect of the present invention is the provision of a snowmobile platform. The platform includes a tunnel subassembly selected from a group of tunnel subassemblies. It also includes an engine cradle subassembly, selected from a group of engine cradle subassemblies, attached forwardly of the tunnel subassembly. The platform also includes a front suspension subassembly, selected from a group of front suspension subassemblies, attached forwardly to the engine compartment subassembly.

Other aspects of the present invention will become apparent from the discussion that follows.

DESCRIPTION OF THE DRAWINGS

Throughout the description of the present invention, reference to common elements will be made using the same reference numbers, in which.

DESCRIPTION OF EMBODIMENT(S) OF THE INVENTION

Figure 3:
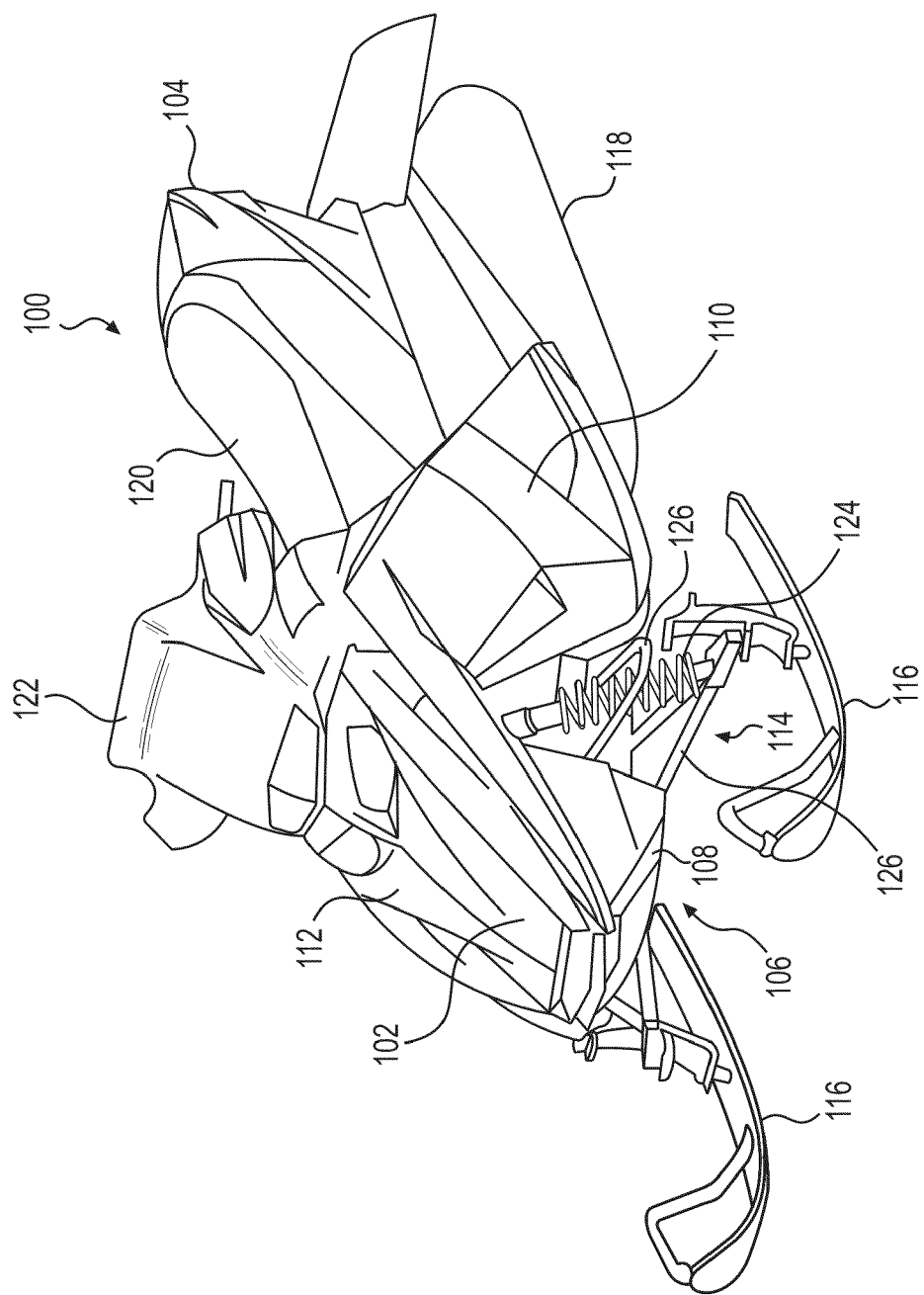
FIG. 3 is a perspective illustration of the snowmobile that provided the impetus for the teachings of the present invention.

FIG. 3 illustrates one possible embodiment of a snowmobile 100 designed and constructed in accordance with the teachings of the present invention. The snowmobile 100 has a front end 102 and a rear end 104. The front end 102 is provided with one or more fairing elements 106, including a bottom pan 108, a side panel 110, and a motor cover 112 As would be understood by those skilled in the art, the front end 102 of the snowmobile 100 houses the engine (not shown) beneath the fairing elements 106. A front suspension 114 is connected at the front end 102 of the snowmobile 100. As with the prior art snowmobile, two skis 116 are suspended from the front suspension 114.

The endless track 118 that is operatively connected to the engine is disposed beneath the rear end 104 of the snowmobile 100. A seat 120 is positioned generally above the endless track 118. A windshield 122 is disposed atop the fairing elements 106 at the front end 102 of the snowmobile 100. A handlebar (not shown) is positioned behind the windshield 122. The handlebar is operatively connected to the skis 116 so that the snowmobile 100 may be turned during operation.

Figure 1:
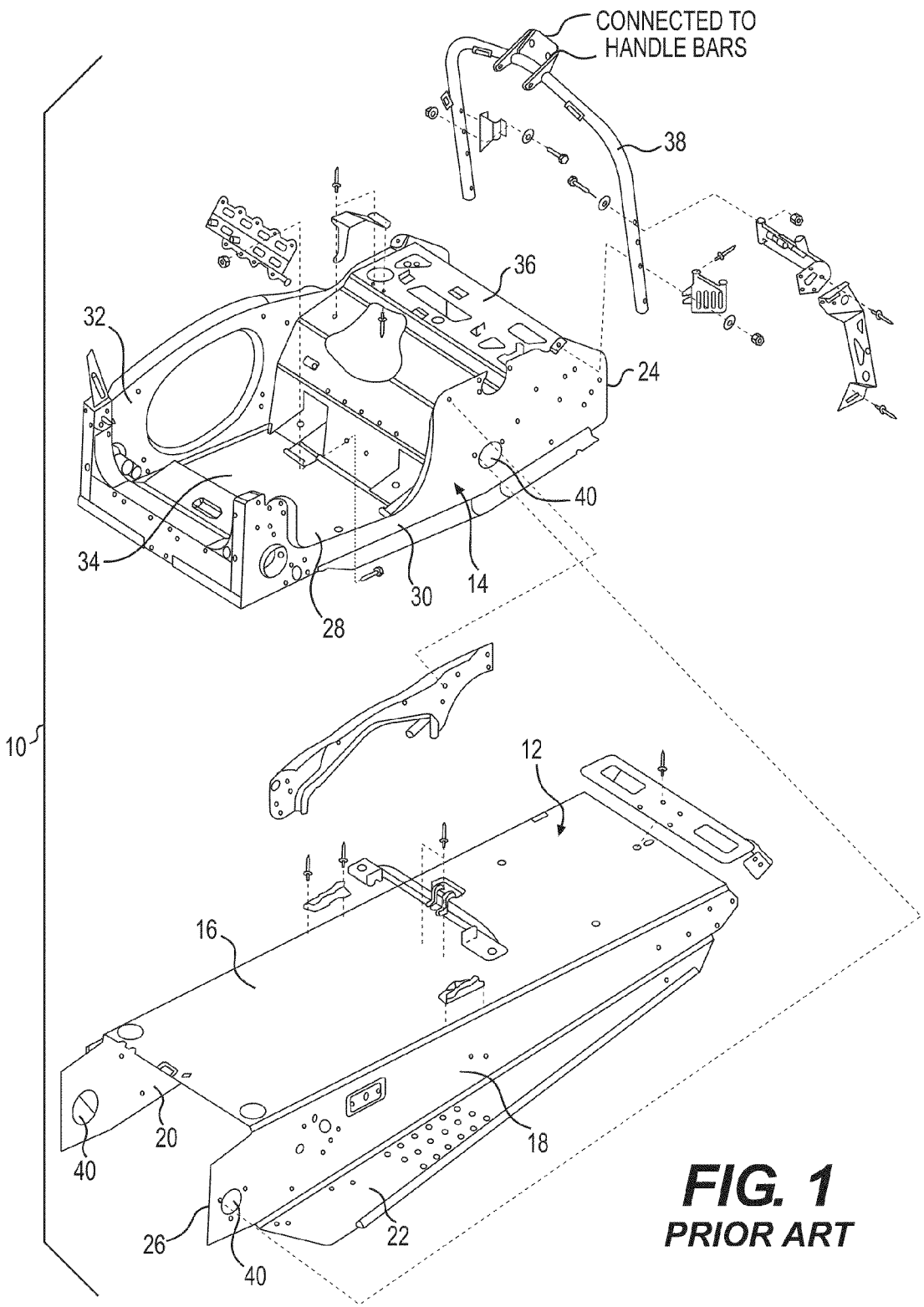
FIG. 1 is an exploded, perspective illustration of a platform of a prior art snowmobile, illustrating the tunnel and engine cradle that form a part of the platform.
Figure 2:
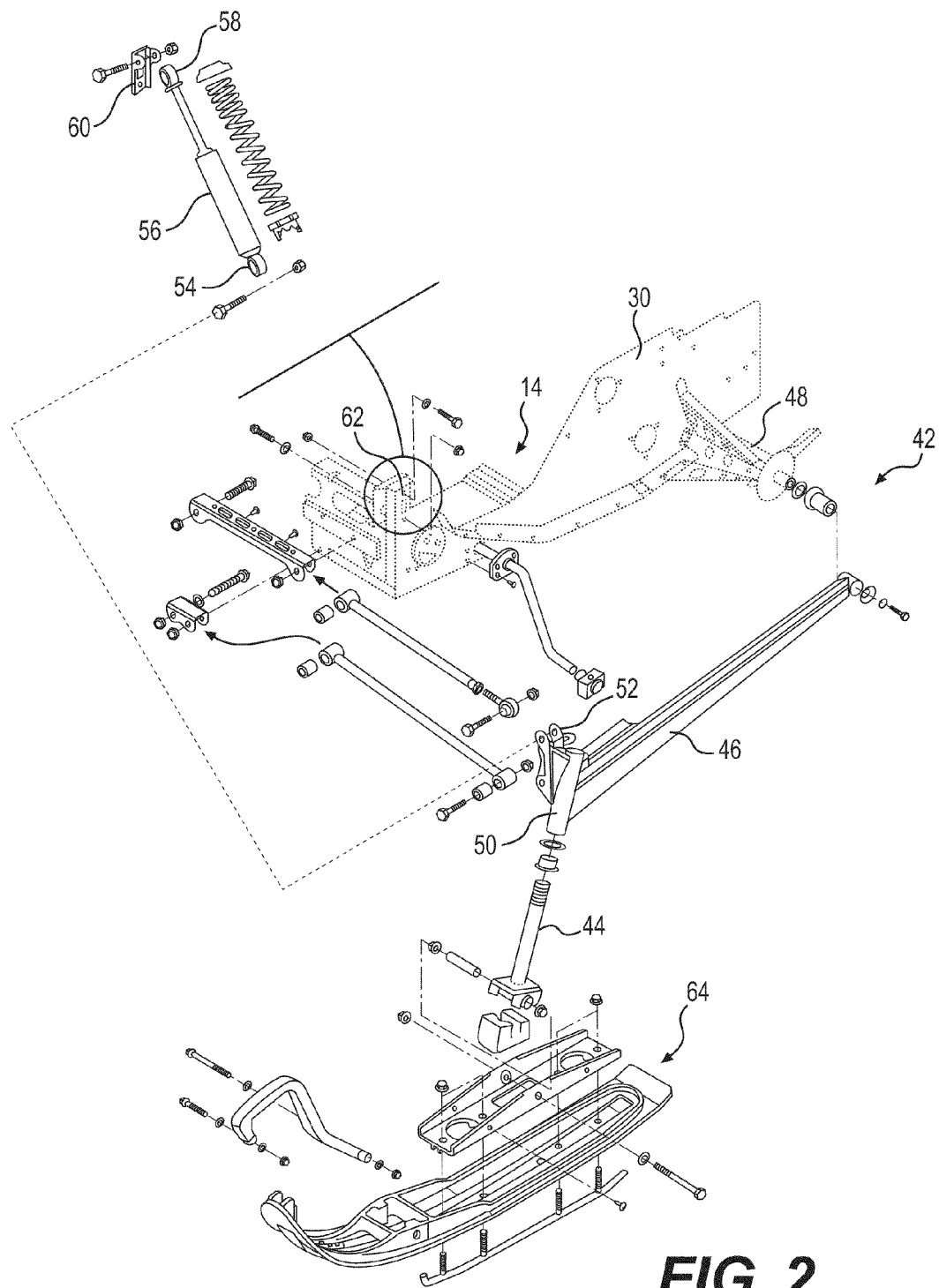
FIG. 2 is an exploded perspective illustration of the front suspension subassembly for the platform of a prior art snowmobile, such as the platform illustrated in FIG. 1.

The front suspension 114 of the snowmobile 100 differs from the front suspension 42 on the prior art snowmobile illustrated in FIGS. 1 and 2 in at least one significant respect. In particular, the front suspension 114 is a double A-arm suspension, much like the type of suspension incorporated into automobiles. Shock absorbers 124 connect between the A-arms 126 of the front suspension 114 and the frame of the snowmobile 100 to dampen the forces experienced by the snowmobile 100 during operation.

Figure 4:
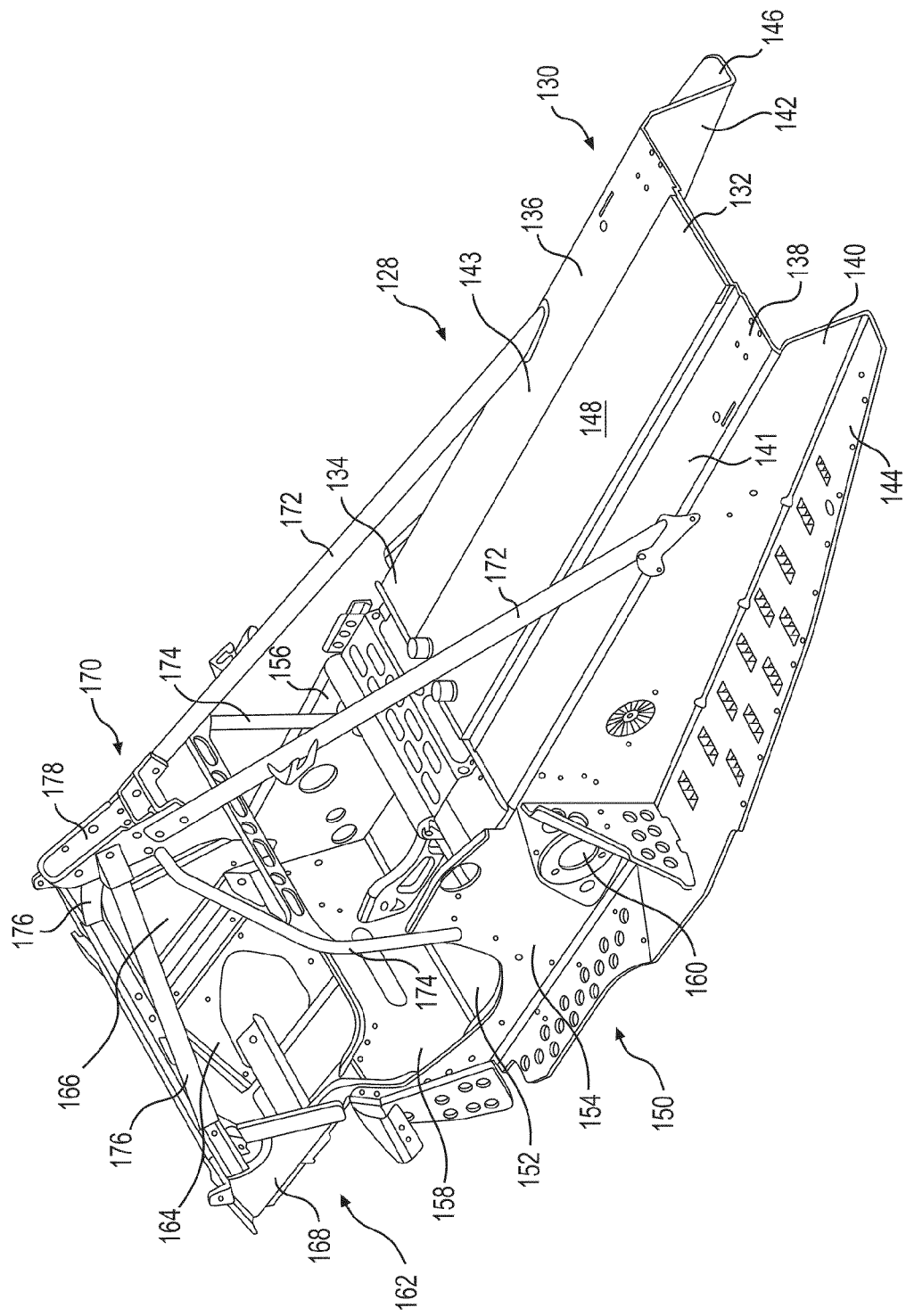
FIG. 4 is a perspective illustration, from the left, rear side, of the snowmobile platform from the snowmobile illustrated in FIG. 3.

FIG. 4 illustrates, from the rear left side, the platform 128 designed for the snowmobile 100 illustrated in FIG. 3. The platform 128 includes a tunnel subassembly 130 with a rear end 132 and a front end 134. The tunnel subassembly 130 comprises an inverted U-shaped tunnel 136 having a top portion 138 and left and right sides 140, 142 extending downwardly from the top portion 138. A left footboard 144 extends outwardly from the bottom of the left side 140 of the tunnel 136. Similarly, a right footboard 146 extends outwardly from the bottom of the right side 142 of the tunnel 136. A radiator 148 is incorporated into the top portion 138 of the tunnel 136 and is a part of the tunnel subassembly 128 illustrated in this figure. The radiator 148, which fluidly connects to the engine to cool the engine, is positioned to receive snow thrown thereupon by the endless track 118 positioned beneath the tunnel 136.

FIG. 4 also illustrates another aspect of the tunnel 136. In particular, the tunnel 136 has a left-hand portion 141 and a right-hand portion 143. As illustrated, the left-hand portion 141 and the right-hand portion 143 are connected to either side of the radiator 148. So constructed, the left-hand portion 141 and the right-hand portion 143 may be separated from the radiator 148 and replaced with wider or narrower replacements to widen or narrow the width of the tunnel 136.

As would be appreciated by those skilled in the art, the radiator 148 need not be included in the tunnel 136. If the radiator is omitted, the left-hand portion 141 and the right-hand portion 143 would join one another at a seam roughly at the center of the tunnel 136. With such a construction, the left-hand portion 141 could be separated from the right-hand portion 143 so that the two portions could be replaced with wider or narrower left-hand and right-hand portions 141, 143. Accordingly, the width of the tunnel 136 could be made wider or made narrower, depending upon the width required for the platform 128.

An engine cradle subassembly 150 connects to the front end 134 of the tunnel subassembly 128. The engine cradle subassembly 150 includes, among other elements, a bottom pan 152, a left wall 154, a right wall 156, a front wall 158, and a rear wall (not shown). An opening 160 is disposed through both the left wall 154 and the right wall 156 of the engine cradle assembly 150. The drive shaft (not shown) of the snowmobile 100 extends through the opening 160. The drive shaft connects between the engine and the endless track 118 to transmit motive power from the engine to the endless track 118.

As FIG. 4 illustrates, the left side wall 154 and the right side wall 156 of the engine cradle subassembly 150 do not need to have the same construction. In particular, the left side wall 154 has an open construction, which permits ready access to the engine placed within the engine cradle subassembly 150. The right side wall 156, on the other hand, has a closed construction that reflects heat generated by the engine back into the engine cradle subassembly 150. Accordingly, the right side wall 156 helps to manage heat losses from the engine during operation of the snowmobile. Other constructions for the left side wall 154 and the right side wall 156 are also possible, including a closed construction with removable sections to facilitate access to the engine when the engine is maintained or serviced.

In another embodiment, it is contemplated that the tunnel subassembly 130 and the engine cradle subassembly 150 may be manufactured together as an integral component of the platform 128. If so manufactured, the left side 140 of the tunnel and the left wall 154 of the engine cradle could be manufactured as a single, unitary left side wall. The right side 142 and the right wall 156 could be similarly combined. If the platform 128 were to be constructed in this fashion, the left-hand wall and the right-hand wall would extend the entire length of the engine cradle subassembly 150 and the tunnel subassembly 130.

As shown in FIG. 4, a front suspension subassembly 162 is connected to and extends forwardly from the engine cradle subassembly 150. The front suspension subassembly 162 includes a V-shaped member 164 that is attached to the engine cradle subassembly 150. Right and left side walls 166, 168 extend upwardly and are integrated with or connected to the V-shaped member 164. The shock absorbers 124 and two A-arms 126 extend outwardly from either side of the front suspension subassembly 162 to support the skis 116 on either side of the snowmobile 100.

An upper frame subassembly 170 is connected to the platform 128 above the tunnel subassembly 130, the engine cradle subassembly 150, and the front suspension subassembly 162. The upper frame subassembly 170 provides additional structural rigidity to the platform 128. The upper frame subassembly 170 includes two rear supports 172, a middle support 174, and two forward supports 176. Together, the rear supports 172, middle support 174, and forward supports 176 for a pyramid-shaped structure that is connected to the tunnel subassembly 130, the engine cradle subassembly 150, and the front suspension subassembly 162. Alternatively, the middle support 174 may be omitted, where appropriate. The upper frame subassembly 170 defines an apex 178, which supports the steering handlebar for the snowmobile 100.

The construction of the platform 128 differs from the platform 10 of the prior art in at least one significant respect. In particular, the platform 128 is designed and constructed so that the front suspension subassembly 162 connects to the front of the engine cradle subassembly 150. For the prior art platform 10, the front suspension 42 was positioned beside or beneath the engine cradle 14, was housed by the engine cradle 14, or was constructed as a part of the engine cradle 14.

The change in the construction of the snowmobile 100 to combine the tunnel subassembly 130, the engine cradle subassembly 150, and the front suspension subassembly 162 together to construct the platform 128 illustrated in FIG. 4 provides numerous advantages, one of which resulted in the development of the present invention.

In particular, the present invention capitalizes upon the fact that the platform 128 is designed and constructed from the tunnel subassembly 130, the engine cradle subassembly 150 and the front suspension subassembly 162. In addition, the present invention also capitalizes on the split construction of the tunnel 136, which has left-hand portions 141 and right-hand portions 143 with a varying width. With such a construction, it is possible to mix and match components to accommodate different riding styles of snowmobiles, a construction methodology previously unavailable to the snowmobile manufacturer.

Figure 5:
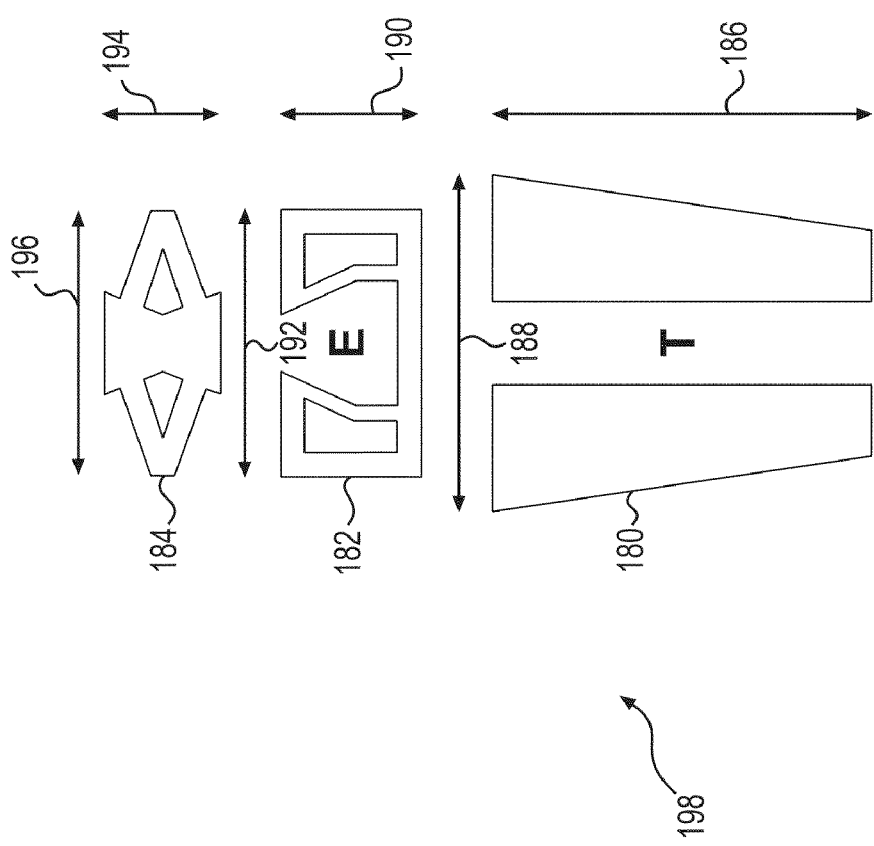
FIG. 5 is a schematic illustration of the relative dimensions associated with the basic elements of the snowmobile platform constructed in accordance with the teachings of the present invention.

FIG. 5 illustrates the basic design and construction concept that underlies the present invention. In particular, the connection of a tunnel assembly 180, an engine cradle subassembly 182, and a front suspension subassembly 184 is illustrated. The three subassemblies are connected in the same order as the platform 128 illustrated in FIG. 4 to create a platform 198. Since these subassemblies may not share the same structural components as the platform 128, different reference numbers are being used to identify these subassemblies.

As illustrated in FIG. 5, the tunnel subassembly 180 has a length 186 and a width 188. Similarly, the engine cradle subassembly 182 has a length 190 and a width 192. The front suspension subassembly 184 also has a length 194 and a width 196. The width of the platform 198 is defined by the largest width of the three subassemblies 180, 182, 184. In this particular example, the width 188 of the tunnel subassembly 180 defines the greatest lateral dimension for the platform 198. It is expected that the tunnel subassembly 180 typically will be the widest of the three components. However, given the variability that the present invention offers, this need not always be the case.

Figure 6:
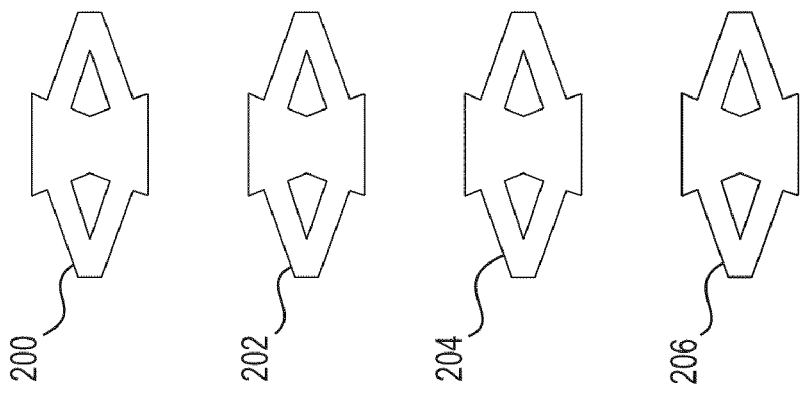
FIG. 6 is a schematic illustration of several variations for the front suspension subassembly for the snowmobile platform designed and manufactured according to the teachings of the present invention.

FIG. 6 illustrates schematically for different front suspension subassemblies: (1) a small platform front suspension subassembly 200, (2) a large platform front suspension subassembly 202, (3) a deep snow front suspension subassembly 204, and (4) a trail front suspension subassembly 206. Each of these front suspension subassemblies differ from one another according to the riding conditions anticipated. For example, the large platform front suspension subassembly 202 will be structurally more robust than the small platform front suspension subassembly 200.

Figure 7:
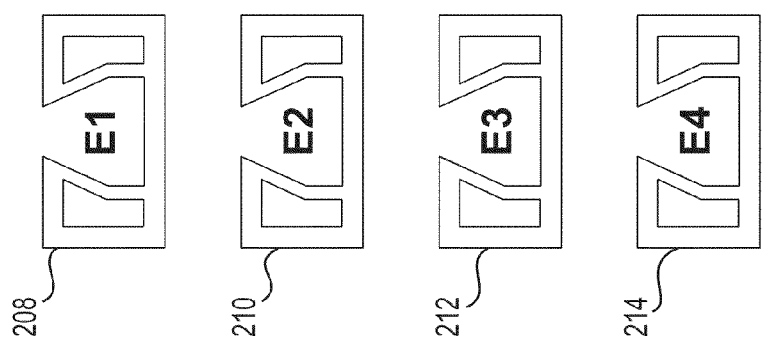
FIG. 7 is a schematic illustration of several variations for the engine cradle subassembly for the snowmobile platform designed and manufactured according to the teachings of the present invention.

FIG. 7 schematically illustrates four different engine cradle subassemblies: (1) a small engine cradle subassembly 208, (2) a medium engine cradle subassembly 210, (3) a large engine cradle subassembly 212, and (4) an extra-large engine cradle subassembly 214. The small engine cradle subassembly 208 is designed and constructed to support a small engine, which includes a two-stroke, one-cylinder engine or a 277 cc-FC engine, for example. The medium engine cradle 210 is designed and constructed to accommodate a medium-sized engine such as a two-stroke 500 cc-FC engine, a similar engine with a larger displacement, or an LC engine with up to an 800 cc displacement, for example. The large engine cradle subassembly 212 is designed and constructed to accommodate large-sized engines including, among other varieties, both two-stroke and four-stroke engines with a displacement of 995 cc and up. It is also contemplated that the large engine cradle subassembly 212 may accommodate an in-line, four-stroke engine. The extra-large engine cradle subassembly 214 is designed and constructed to accommodate extra-large engines including, for example, a four-stroke, V-type 400 cc engine, a four-stroke, V-type 1400 cc engine, or an engine of the same size with a displacement between 400 cc and 1400 cc.

As would be understood by those skilled in the art, the specific engine varieties identified above are meant to be illustrative of the types of engines contemplated for placement into the particular engine cradle subassembly mentioned. The engines listed, however, are not meant to limit the invention. It is contemplated, for example, that a small engine cradle subassembly 208 may accommodate any other type of engine therein. Moreover, the designations "small," "medium," "large," and "extra-large" are meant to be illustrative of the variety of engine cradle subassemblies that may be designed and constructed according to the teachings of the present invention.

Two specific examples of different engine cradle subassemblies are provided below for illustrative purposes. As indicated above, these examples are meant to be illustrative only and are not meant to limit the scope of the present invention.

| Engine Cradle Subassembly for a Two-Stroke 600 cc Engine | |
| --- | --- |
| Width | 44 inches |
| Length | 40 inches |
| Depth | 20 inches |
| Sides | one side open, one side closed |
| Front Engine Mounts | 2 vertical rubber mounts |
| Rear Engine Mounts | 2 vertical rubber mounts |

| Engine Cradle Subassembly for a V-Type 1000 cc Engine | |
| --- | --- |
| Width | 48 inches |
| Length | 44 inches |
| Depth | 30 inches |
| Sides | both sides closed |
| Front Engine Mounts | 2 horizontal rubber mounts |
| Rear Engine Mounts | 2 vertical plate rubber mounts |

Figure 8:
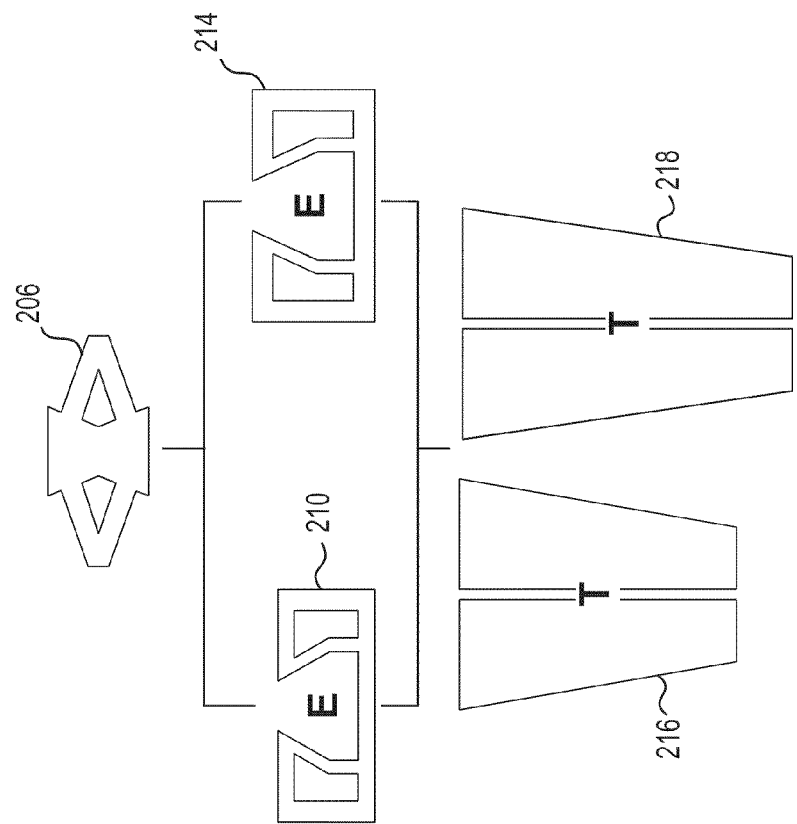
FIG. 8 is a schematic illustration of several variations for a snowmobile platform, emphasizing the interchangeability of the platform components in accordance with the teachings of the present invention.

As illustrated in FIG. 8, the tunnel subassembly 180 also may be designed and constructed to have a variety of widths 188 and lengths 186. For example, a short tunnel subassembly 216 is contemplated for use with a small snowmobile, such as a racing vehicle. Conversely, a long tunnel subassembly 218 is contemplated for use with a mountain snowmobile, for example.

As the foregoing should make apparent, there can be considerable variation from one type of each of the three subassemblies to another. Accordingly, the method for the design and construction of a snowmobile platform of the present invention involves the following. First, a multiplicity of tunnel subassemblies are designed and constructed to meet predetermined structural and operating characteristics. Second, a number of engine cradle assemblies are designed and constructed to meet predetermined structural and operating characteristics. Third, a number of front suspension subassemblies are designed and constructed to meet predetermined structural and operating characteristics. Next, one from each of the tunnel subassemblies, engine cradle subassemblies, and front suspension subassemblies are selected. The three selected subassemblies are then assembled together to form a platform for a particular snowmobile. Then, where additional frame rigidity is deemed appropriate, an upper frame subassembly is attached to the completed platform. Once assembled, the remaining components of the snowmobile are assembled onto the platform.

FIG. 8 provides one example of the variability of the design and manufacturing method of the present invention. In the example provided in FIG. 8, the front suspension subassembly is selected as a constant variable in the construction of a platform 220. As illustrated, the trail front suspension subassembly 206 has been selected. Four variations on the platform 220 are illustrated. The first variation includes a medium engine cradle subassembly 210 to accommodate a two-stroke 400 cc direct injection internal combustion engine. That engine cradle subassembly 210 is then combined with a short tunnel subassembly 216, which is common for a small snowmobile used for racing, for example. The second variation combines the trail front suspension subassembly 206 with the medium engine cradle subassembly 210 and a long tunnel subassembly 218, such as that commonly provided for a mountain snowmobile. The third variation combines the trail front suspension subassembly 206 with the extra-large engine cradle subassembly 214 capable of accommodating a four-stroke, V-type, 855 cc internal combustion engine. A short tunnel subassembly 216 is connected to these components to from the platform 220. The fourth variation combines the trail front suspension subassembly 206 with the extra-large engine cradle subassembly 214 and the long tunnel subassembly 218.

Figure 9:
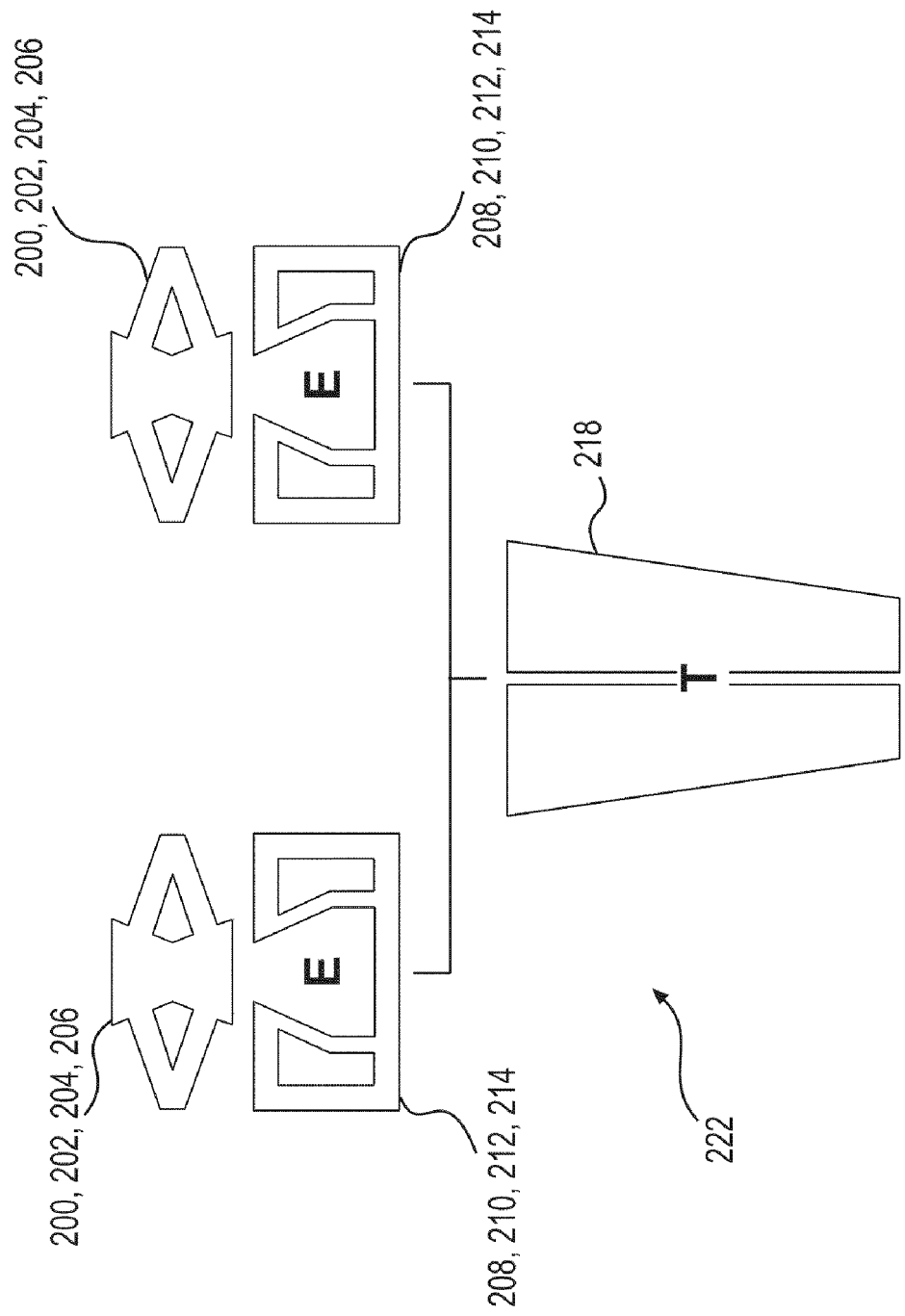
FIG. 9 is a schematic illustration of several additional variations for the snowmobile platform designed and manufactured according to the teachings of the present invention, showing two groups of possible variants of the platform, each of which share a common tunnel subassembly.

FIG. 9 illustrates other variations in the construction of a platform 222. In this example, the tunnel, which is selected as a long tunnel subassembly 218, is combined with any of the engine cradle subassemblies 208, 210, 212, 214 and front suspension subassemblies 200, 202, 204, 206 as may be appropriate for the snowmobile being created.

As would be appreciated by those skilled in the art, the permutations available for the construction of a snowmobile platform using just the components listed above is considerable. With two tunnel subassembly variations, four engine cradle subassembly variations, and four front suspension subassembly variations, there are thirty-two different platforms that may be created. Naturally, if the number of tunnel subassemblies, engine cradle subassemblies, and front suspension subassemblies designed and constructed as a part of the group of potential subassemblies is increased, the number of variations in platforms can be increased further still.

With this in mind, the snowmobile manufacturer may decrease, in some instance greatly decrease, the cost associated with the design and construction of snowmobile platforms. Rather than designing each platform from scratch for each new snowmobile, which has been the practice in the prior art, the snowmobile manufacturer needs only design and construct one of the three subassemblies needed for the new vehicle. The remaining two subassemblies for the platform may be chosen from front suspension subassemblies and tunnel subassemblies previously designed. In addition, manufacturing costs may be reduced, because the knowledge and training required for assembly line professionals may be reduced. Other advantages also may be realized by practicing the present invention.

The embodiments of the present invention that are described above are meant to be illustrative of the present invention only. The embodiments illustrated and described are not meant to limit the present invention solely to the embodiments described. Those skilled in the art would readily appreciate the unlimited potential of the present invention.

What is claimed is:

1. A method of assembling a snowmobile platform, comprising:
   providing a group of front suspension subassemblies, the group of front suspension subassemblies including at least two front suspension subassemblies having different characteristics;
   providing a group of engine cradle subassemblies, the group of engine cradle subassemblies including at least two engine cradle subassemblies having different characteristics, each of the engine cradle subassemblies of the group of engine cradle subassemblies being connectable to each of the front suspension subassemblies of the group of front suspension subassemblies;
   providing a group of tunnel subassemblies, the group of tunnel subassemblies including at least two tunnel subassemblies having different characteristics, each of the tunnel subassemblies of the group of tunnel subassemblies being connectable to each of the engine cradle of the group of engine cradle subassemblies,
   forming a snowmobile platform at least in part by combining a front suspension subassembly selected from the group of front suspension subassemblies, an engine cradle subassembly selected from the group of engine cradle subassemblies and a tunnel subassembly selected from the group of tunnel subassemblies.

2. The method of assembling a snowmobile platform of claim 1, further comprising:
   forming the tunnel subassembly and the engine cradle subassembly integrally as a single component.

3. The method of assembling a snowmobile platform of claim 1, further comprising:
   attaching the engine cradle subassembly to the tunnel subassembly.

4. The method of assembling a snowmobile platform of claim 1, wherein:
   the group of tunnel subassemblies includes a short tunnel subassembly and a long tunnel subassembly.

5. The method of assembling a snowmobile platform of claim 1, wherein:
   the group of engine cradle subassemblies includes at least two from a group comprising a small engine cradle subassembly, a medium engine cradle subassembly, a large engine cradle subassembly, and an extra-large engine cradle subassembly.

6. The method of assembling a snowmobile platform of claim 1, wherein:
the group of front suspension subassemblies includes at least two selected from a group comprising a small platform front suspension subassembly, a large platform front suspension subassembly, a deep snow front suspension subassembly, and a trail front suspension subassembly.

7. The method of assembling a snowmobile platform of claim 1, further comprising:
connecting an upper frame subassembly to at least two of the tunnel subassembly, the engine cradle subassembly, and the front suspension subassembly.

8. The method of assembling a snowmobile platform of claim 1, wherein the selected tunnel subassembly comprises:
a top with left and right sides,
a left side wall extending downwardly from the left side of the top, and
a right side wall extending downwardly from the right side of the top,
such that the selected tunnel subassembly forms an inverted U-shaped tunnel.

9. The method of assembling a snowmobile platform of claim 8, wherein:
a width of the tunnel subassembly is selected at least as a function of a width of an endless track selected for attachment to the snowmobile platform; and
a length of the tunnel subassembly is selected at least as a function of a length of the endless track selected for attachment to the snowmobile platform.

10. The method of assembling a snowmobile platform of claim 1, wherein the selected engine cradle subassembly comprises:
a bottom pan with left, right, front, and rear sides;
a left side wall attached to the left side of the bottom pan;
a right side wall attached to the right side of the bottom pan;
a front wall attached to the front of the bottom pan; and
a rear wall attached to the rear of the bottom pan.

11. The method of assembling a snowmobile platform of claim 10, wherein:
the width of the engine cradle subassembly is selected at least as a function of a size of an engine selected for placement onto the snowmobile platform; and
the length of the tunnel subassembly is selected at least as a function of the size of the engine selected for placement onto the snowmobile platform.

12. The method of assembling a snowmobile platform of claim 1, wherein the selected front suspension subassembly comprises:
a V-shaped member with left and right sides;
a left side wall attached to the left side of the V-shaped member;
a right side wall attached to the right side of the V-shaped member; at least four A-arms pivotally connected to the V-shaped member, two on the left side and two on the right side;
at least one shock absorber connected between the left side wall and one of the A-arms on the left side of the V-shaped member; and
at least one shock absorber connected between the right side wall and one of the A-arms on the right side of the V-shaped member.

* * * * *